(12) United States Patent
Ignaczak et al.

(10) Patent No.: US 10,975,993 B2
(45) Date of Patent: Apr. 13, 2021

(54) FLUID LINE CONNECTOR AND ASSEMBLY WITH SECUREMENT DETECTION

(71) Applicant: Norma U.S. Holding LLC, Auburn Hills, MI (US)

(72) Inventors: Brian T. Ignaczak, Rochester, MI (US); Dave Peterson, Ortonville, MI (US); Viktor Stoll, Großkrotzenburg (DE); René Schindler, Maintal (DE)

(73) Assignee: Norma U.S. Holding LLC, Auburn Hills, MI (US)

( * ) Notice: Subject to any disclaimer, the term of this patent is extended or adjusted under 35 U.S.C. 154(b) by 268 days.

(21) Appl. No.: 16/102,256

(22) Filed: Aug. 13, 2018

(65) Prior Publication Data
US 2019/0049049 A1    Feb. 14, 2019

Related U.S. Application Data

(60) Provisional application No. 62/544,057, filed on Aug. 11, 2017.

(51) Int. Cl.
*F16L 37/00* (2006.01)
*G06K 19/077* (2006.01)
(Continued)

(52) U.S. Cl.
CPC ........ *F16L 37/004* (2013.01); *G06K 19/0716* (2013.01); *G06K 19/0723* (2013.01);
(Continued)

(58) Field of Classification Search
CPC .... G02B 6/3895; H04Q 1/138; H01R 13/465; G06K 19/07758; G06K 19/0717; F16L 37/0841
See application file for complete search history.

(56) References Cited

U.S. PATENT DOCUMENTS 5,604,681 A * 2/1997 Koeninger ............ B67D 7/348
                                                   700/285
5,682,662 A   11/1997 Coules et al.
(Continued)

FOREIGN PATENT DOCUMENTS

CN    205669645 U    11/2016
CN    206929469 U     1/2018
(Continued)

OTHER PUBLICATIONS

Russian Office Action for Application No. 2020109887 dated Jun. 3, 2020 (4 pages).
(Continued)

*Primary Examiner* — Brian E Miller
(74) *Attorney, Agent, or Firm* — Reising Ethington, P.C.

(57) ABSTRACT

A fluid line connector and assembly provides remote securement detection and is hence equipped for initial assembly, subsequent quality inspection, and subsequent service techniques that are automated, robotic, and/or autonomous. The fluid line connector includes a body, a radio-frequency identification (RFID) chip, and a switch. The body has a passage for fluid-flow therethrough. The RFID chip has an antenna for transmitting and receiving radio frequency (RF) signals. The switch interacts with the antenna to enable the antenna to transmit and receive RF signals, and to alternatively disable the antenna from transmitting and receiving RF signals.

20 Claims, 2 Drawing Sheets

(51) Int. Cl.
*H04W 4/80* (2018.01)
*G06K 19/07* (2006.01)
*G06K 19/073* (2006.01)
*F16L 37/098* (2006.01)

(52) U.S. Cl.
CPC ........ *G06K 19/07758* (2013.01); *H04W 4/80* (2018.02); *F16L 37/0985* (2013.01); *F16L 2201/10* (2013.01); *G06K 19/07345* (2013.01); *G06K 19/07775* (2013.01)

(56) References Cited

U.S. PATENT DOCUMENTS

| | | | |
|---|---|---|---|
| 6,443,747 | B2 | 9/2002 | Saba |
| 6,649,829 | B2 | 11/2003 | Garber et al. |
| 6,897,374 | B2 | 5/2005 | Garber et al. |
| 7,128,347 | B2 | 10/2006 | Kerin |
| 7,244,142 | B2 | 7/2007 | Kato |
| 7,394,375 | B2 * | 7/2008 | Johnson ................ B67D 7/348 156/125 |
| 7,458,400 | B2 * | 12/2008 | Weh .................... B67D 7/425 141/347 |
| 7,647,954 | B2 | 1/2010 | Garber et al. |
| 7,841,357 | B2 | 11/2010 | Rankin |
| 7,954,374 | B2 | 6/2011 | Rankin |
| 8,373,961 | B2 | 2/2013 | Kück et al. |
| 8,393,646 | B2 | 3/2013 | Galle et al. |
| 8,401,777 | B2 | 3/2013 | Ryman |
| 8,427,179 | B2 | 4/2013 | Chamberlin |
| 8,439,404 | B2 | 5/2013 | Anton et al. |
| 8,720,772 | B2 | 5/2014 | Colman et al. |
| 8,894,428 | B2 | 11/2014 | Cecchinelli |
| 9,188,267 | B2 | 11/2015 | Fansler |
| 9,469,410 | B2 | 10/2016 | Peake |
| 9,604,838 | B2 | 3/2017 | Cornett et al. |
| 9,744,321 | B2 | 8/2017 | Tham et al. |
| 9,886,679 | B2 | 2/2018 | Bianco et al. |
| 9,890,873 | B2 | 2/2018 | Schwobe et al. |
| 10,155,126 | B2 * | 12/2018 | Schwobe ............... A62C 37/10 |
| 10,295,093 | B2 | 5/2019 | Anton et al. |
| 10,690,277 | B2 * | 6/2020 | Fremont ............ F16L 37/0985 |
| 10,741,103 | B2 | 8/2020 | Danielson et al. |
| 2002/0170731 | A1 * | 11/2002 | Garber .................. B67D 7/348 174/47 |
| 2003/0057700 | A1 | 3/2003 | Endo |
| 2003/0218335 | A1 * | 11/2003 | Takayanagi ......... F16L 37/0987 285/319 |
| 2004/0036273 | A1 | 2/2004 | McClary |
| 2006/0076419 | A1 | 4/2006 | Johnson |
| 2007/0200723 | A1 | 8/2007 | Newberg |
| 2007/0209716 | A1 * | 9/2007 | Rankin ............... F16K 37/0033 137/554 |
| 2009/0066531 | A1 | 3/2009 | Boubtane et al. |
| 2010/0326219 | A1 | 12/2010 | Nelson et al. |
| 2011/0273296 | A1 * | 11/2011 | Laase .................... G06Q 10/00 340/572.1 |
| 2012/0247179 | A1 | 10/2012 | Kerin et al. |
| 2012/0256756 | A1 * | 10/2012 | Johnson ............... G06K 7/0008 340/687 |
| 2013/0008233 | A1 * | 1/2013 | Kosugi ............... A61B 1/00059 73/40.5 R |
| 2013/0180318 | A1 * | 7/2013 | Howard .................. G01M 3/04 73/49.2 |
| 2014/0158615 | A1 * | 6/2014 | Senf .................... G01N 30/6091 210/635 |
| 2015/0000669 | A1 | 1/2015 | Miller |
| 2015/0192234 | A1 | 7/2015 | Fries et al. |
| 2015/0204752 | A1 | 7/2015 | Miller |
| 2016/0135667 | A1 * | 5/2016 | Takazawa ........... A61B 1/00128 134/166 C |
| 2016/0178101 | A1 | 6/2016 | Blake et al. |
| 2016/0189888 | A1 * | 6/2016 | Blackwood .......... H04B 5/0062 340/10.5 |
| 2016/0229680 | A1 | 8/2016 | Cornett et al. |
| 2016/0298796 | A1 | 10/2016 | Anton et al. |
| 2017/0037991 | A1 | 2/2017 | Danielson et al. |
| 2017/0052079 | A1 | 2/2017 | Clark |
| 2017/0089496 | A1 * | 3/2017 | Lennon ................ F16L 13/146 |
| 2017/0224975 | A1 | 8/2017 | Peer et al. |
| 2018/0073670 | A1 * | 3/2018 | Wolfgang .......... F16L 37/0841 |
| 2018/0180207 | A1 * | 6/2018 | Yashin .................. F16L 37/084 |
| 2018/0245723 | A1 | 8/2018 | Lazzari et al. |
| 2018/0266602 | A1 | 9/2018 | Fremont |
| 2018/0340556 | A1 | 11/2018 | Vriends et al. |
| 2019/0049049 | A1 * | 2/2019 | Ignaczak .......... G06K 19/07758 |
| 2019/0071300 | A1 | 3/2019 | Reinholdt |
| 2019/0257456 | A1 | 8/2019 | Ignaczak et al. |
| 2020/0074260 | A1 | 3/2020 | Puvogel et al. |
| 2020/0156857 | A1 * | 5/2020 | Rider ................... B67D 1/0412 |

FOREIGN PATENT DOCUMENTS

| | | |
|---|---|---|
| CN | 107740893 A | 2/2018 |
| CN | 108317321 A | 7/2018 |
| DE | 3830475 A1 | 3/1990 |
| DE | 4336827 C1 | 1/1995 |
| DE | 202004002116 U1 | 6/2004 |
| DE | 102005029061 A1 | 1/2007 |
| DE | 102008008423 B4 | 4/2010 |
| DE | 102011088505 B4 | 3/2016 |
| DE | 102016003652 A1 | 10/2017 |
| DE | 102016205171 A1 | 10/2017 |
| EP | 0487844 B1 | 7/1994 |
| EP | 1762541 B1 | 1/2011 |
| EP | 2180224 B1 | 3/2014 |
| EP | 3276240 A1 | 1/2018 |
| EP | 3544114 A1 | 9/2019 |
| FR | 2983557 B1 | 5/2015 |
| GB | 2406887 B | 3/2007 |
| GB | 2564757 A | 1/2019 |
| JP | 3235064 B2 | 12/2001 |
| JP | 4198472 B2 | 12/2008 |
| JP | 2013534993 A | 9/2013 |
| KR | 20080047134 A | 5/2008 |
| WO | WO2005078330 A1 | 8/2005 |
| WO | WO2007003770 A1 | 1/2007 |
| WO | WO2011003523 A1 | 1/2011 |
| WO | WO2011035987 A1 | 3/2011 |
| WO | WO2013131632 A1 | 9/2013 |
| WO | WO2018083287 A1 | 5/2018 |
| WO | WO2018104901 A1 | 6/2018 |
| WO | WO2018109233 A1 | 6/2018 |
| WO | WO2018172789 A1 | 9/2018 |

OTHER PUBLICATIONS

Russian Search Report for Application No. 2020109887 dated Jun. 3, 2020 (2 pages).
International Search Report and Written Opinion for International Application No. PCT/US2018/046528, dated Dec. 7, 2018; 14 pages.
International Preliminary Report on Patentability for International Application No. PCT/US2018/046528 dated Feb. 11, 2020 (10 pages).
International Search Report for International Application No. PCT/US2020/058113 dated Feb. 18, 2021 (3 pages).
Written Opinion for International Application No. PCT/US2020/058113 dated Feb. 18, 2021 (5 pages).

* cited by examiner

FLUID LINE CONNECTOR AND ASSEMBLY WITH SECUREMENT DETECTION

CROSS-REFERENCE TO RELATED APPLICATION

This application claims the benefit of U.S. Provisional Patent Application No. 62/544,057, filed Aug. 11, 2017.

TECHNICAL FIELD

This disclosure relates generally to connector assemblies used to join fluid lines together and, more particularly, to ways of detecting proper and full engagement of connector assembly members.

BACKGROUND

Connector assemblies, especially those with quick-connect functionality, are commonly used to join fluid lines together in vehicle applications. One example is coolant fluid lines in electric vehicle automobiles. For initial assembly and inspection and subsequent service, visual measures are sometimes employed in the design and construction of a connector assembly in order to verify that a proper and full engagement has been made between members of the connector assembly. Examples include secondary latches that are closable upon full engagement, and windows framed in one the members of the connector assembly for viewing engagement. These measures, as well as others like them, require physical interaction and viewing by the assembler, inspector, or servicer to ensure that a proper and full engagement has been made between the members of the connector assembly.

SUMMARY

In an embodiment, a fluid line connector may include a body, a radio-frequency identification (RFID) chip, and a switch. The body has a passage for fluid-flow through the body. The RFID chip is carried by the body and has an antenna. The antenna can transmit and receive radio frequency (RF) signals. The switch interacts with the RFID chip. The interaction can enable the antenna to transmit and receive RF signals and can disable the antenna from transmitting and receiving RF signals. When full securement occurs between the fluid line connector and another component, the switch enables the antenna to transmit and receive RF signals.

In an embodiment, when the fluid line connector lacks full securement with the other connector, the switch disables the antenna from transmitting and receiving RF signals.

In an embodiment, the fluid line connector may include an o-ring and an insert. The o-ring is received within the passage of the body. The insert is received partially or more within the passage. The insert assists retention of the other connector that is in securement with the fluid line connector.

In an embodiment, the RFID chip has an integrated circuit (IC) and an antenna. The IC stores data. The antenna is enabled to transmit the data upon full securement of the fluid line connector with the other connector.

In an embodiment, the body has a compartment that is separate from the passage. The RFID chip resides within the compartment. The compartment can be closed by a cover.

In an embodiment, the switch is a button. Upon full securement of the fluid line connector with the other connector, the button is impinged and the antenna is enabled to transmit and receive RF signals.

In an embodiment, upon full securement of the fluid line connector with the other connector, abutment from the other connector causes an impingement with the switch. The switch then enables the antenna to transmit and receive RF signals.

In an embodiment, the fluid line connector may include an actuator member. The actuator member is situated near the passage of the body. Upon full securement of the fluid line connector with the other connector, the other connector abuts the actuator member, and the actuator member in turn impinges the switch. The switch then enables the antenna to transmit and receive RF signals.

In an embodiment, the switch is a button.

In an embodiment, the actuator member is a cam member. The cam member has a first working surface that resides at or near the passage, and has a second working surface that resides at or near the button. Upon full securement of the fluid line connector with the other connector, a flange of the other connector abuts the first working surface of the cam member, and the second working surface of the cam member in turn impinges the button. The button then enables the antenna to transmit and receive RF signals.

In an embodiment, the fluid line connector may include a second RFID chip. The second RFID chip is carried by the body. The second RFID chip has a second antenna for transmitting and receiving RF signals. The switch interacts with the second RFID chip. Upon full securement of the fluid line connector with the other connector, the switch enables the first antenna or the second antenna to transmit and receive RF signals.

In an embodiment, when the fluid line connector lacks full securement with the other connector, the switch enables the other of the first antenna or the second antenna to transmit and receive RF signals.

In an embodiment, the switch may include a reed switch and a magnetic component. The reed switch resides with the fluid line connector near or at the RFID chip. The magnetic component resides on the other connector.

In an embodiment, a fluid line connector assembly may include the fluid line connector and an RFID interrogator. The RFID interrogator exchanges RF signals with the RFID chip of the fluid line connector.

In another embodiment, a fluid line connector may include a body, a radio-frequency identification (RFID) chip, and a switch. The body has a passage. The RFID chip is carried by the body. The switch is electrically coupled with the RFID chip. When the fluid line connector is brought fully together with another connector, abutment occurs between the fluid line connector and the other connector, and the RFID chip is hence enabled to transmit and receive radio frequency (RF) signals by way of the switch. When the fluid line connector and the other connector are not fully together, the abutment that enables the RFID chip to transmit and receive RF signals is absent.

In an embodiment, the fluid line connector may include an actuator member. The abutment that occurs between the fluid line connector and the other connector causes the actuator member to impinge the switch. The RFID chip is hence enabled to transmit and receive RF signals by way of the impingement.

In an embodiment, the fluid line connector may include an actuator member. The actuator member spans between the passage and the switch. The abutment that occurs between the fluid line connector and the other connector involves the actuator member, and displaces the actuator member to impinge the switch. The RFID chip is hence enabled to transmit and receive RF signals by way of the impingement.

In an embodiment, the fluid line connector may include a cam member. The cam member is situated partially or more within a pass-through that is defined in the body. The cam member has a first working surface that resides at or near the passage, and has a second working surface that resides at or near the switch. The abutment that occurs between the fluid line connector and the other connector involves a flange of the other connector abutting the first working surface and displacing the second working surface to impinge the switch. The RFID chip is hence enabled to transmit and receive RF signals by way of the impingement.

In yet another embodiment, a fluid line connector may include a body, a radio-frequency identification (RFID) chip, a switch, and an actuator member. The body has a passage. The RFID chip is carried by the body. The switch is electrically coupled with the RFID chip. The actuator member spans between the passage and the switch. When the fluid line connector is brought fully together with another connector, the other connector abuts the actuator member, and the actuator member is displaced and impinges the switch.

In an embodiment, impingement of the switch enables the RFID chip to transmit and receive RF signals.

BRIEF DESCRIPTION OF THE DRAWINGS

Embodiments of the disclosure are described with reference to the appended drawings, in which.

DETAILED DESCRIPTION

Several embodiments of a fluid line connector and assembly are detailed in this description. The connectors and assemblies are designed and constructed to enable detection of proper and full securement between connectors without the necessity of the secondary latches and windows of the past that required some level of physical interaction and viewing by an assembler, inspector, or servicer at the site of securement. Instead, the connectors and assemblies of this description are provided with means in which proper and full securement can be detected via a device that is located remote of an immediate site of securement of the connectors, and the device need not necessarily make physical contact with the site of securement for detection. In this way, the connectors and assemblies are equipped for initial assembly, subsequent quality inspection, and subsequent service techniques that are automated, robotic, and/or autonomous—those found, for instance, in advanced manufacturing facilities in automotive production. The connectors and assemblies hence could prove useful in many applications, such as when an immediate power supply is not readily available and not readily at-hand. This description presents the connectors and assemblies in the context of automotive fluid lines, such as coolant fluid lines in electric vehicle automobiles, but the connectors and assemblies have broader application and are suitable for use in aircraft fluid lines, marine fluid lines, agricultural fluid lines, as well as other fluid lines.

As used herein, the phrase "full securement" and its grammatical variations is used to refer to a state of securement in which a fluid-tight joint is established via the fluid line connector. Furthermore, unless otherwise specified, the terms radially, axially, and circumferentially, and their grammatical variations refer to directions with respect to the generally circular shape of the passage of the fluid line connector.

Figure 2:
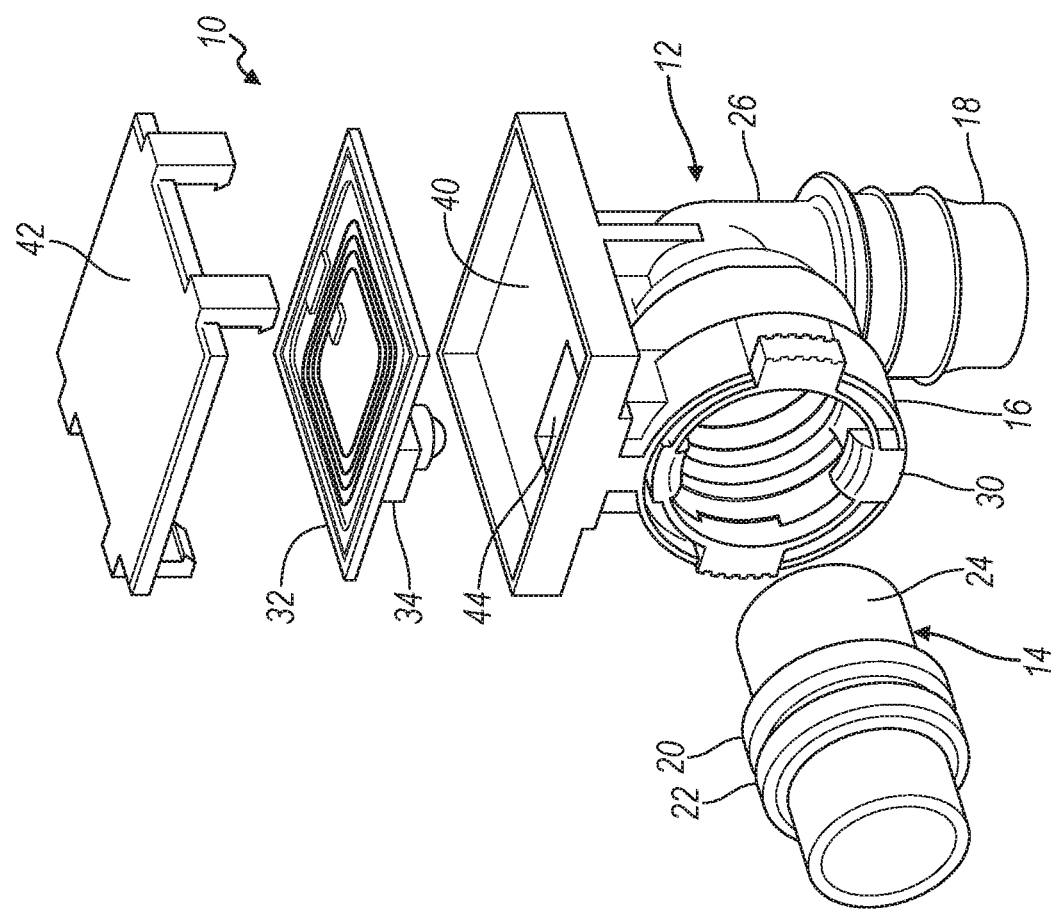
FIG. 2 is a partially exploded view of the fluid line connector assembly of FIG. 1.
Figure 1:
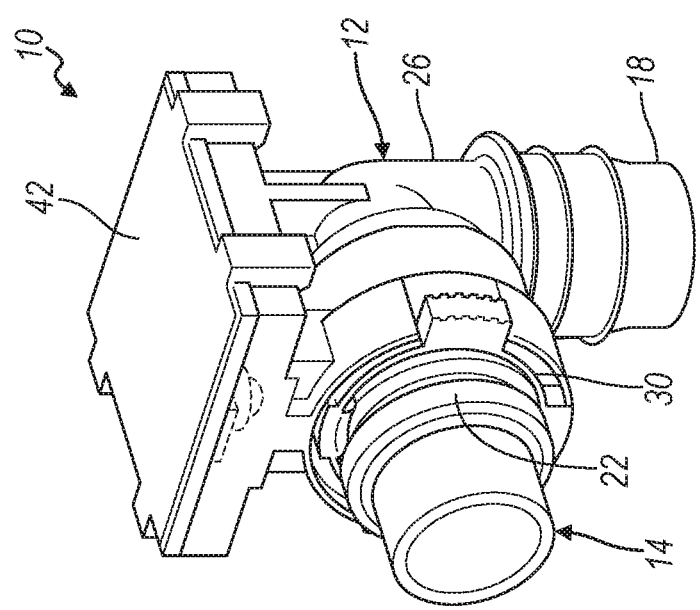
FIG. 1 is a perspective view of an embodiment of a fluid line connector assembly.
Figure 3:
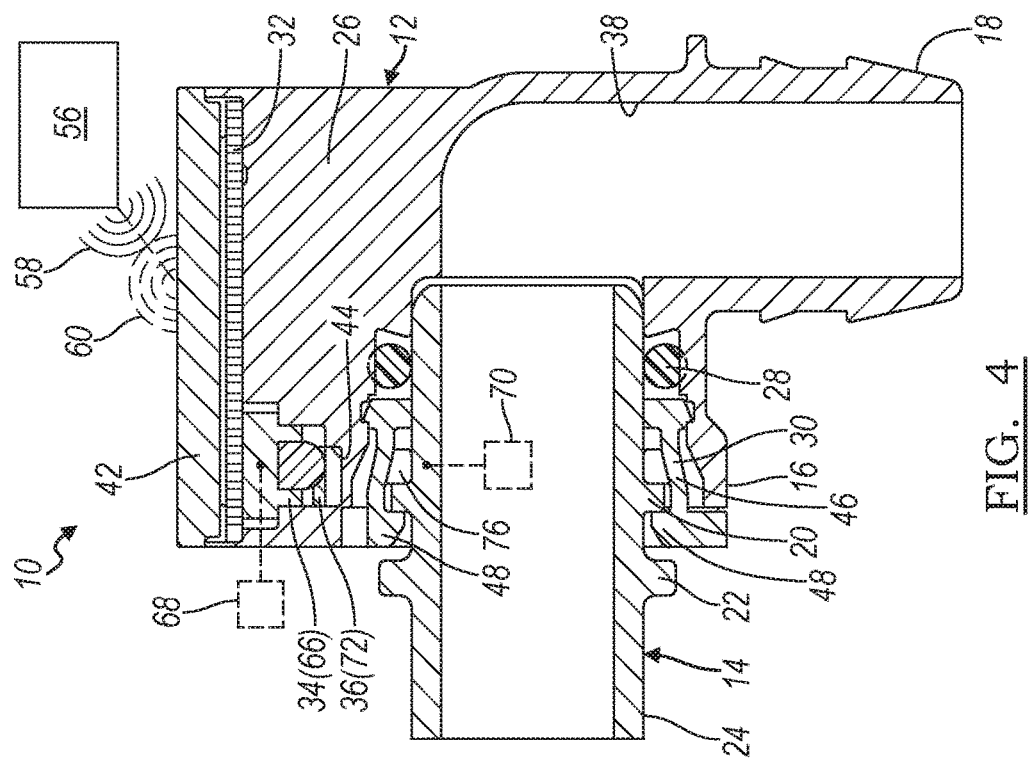
FIG. 3 is an exploded view of a fluid line connector of the fluid line connector assembly of FIG. 1.
Figure 4:
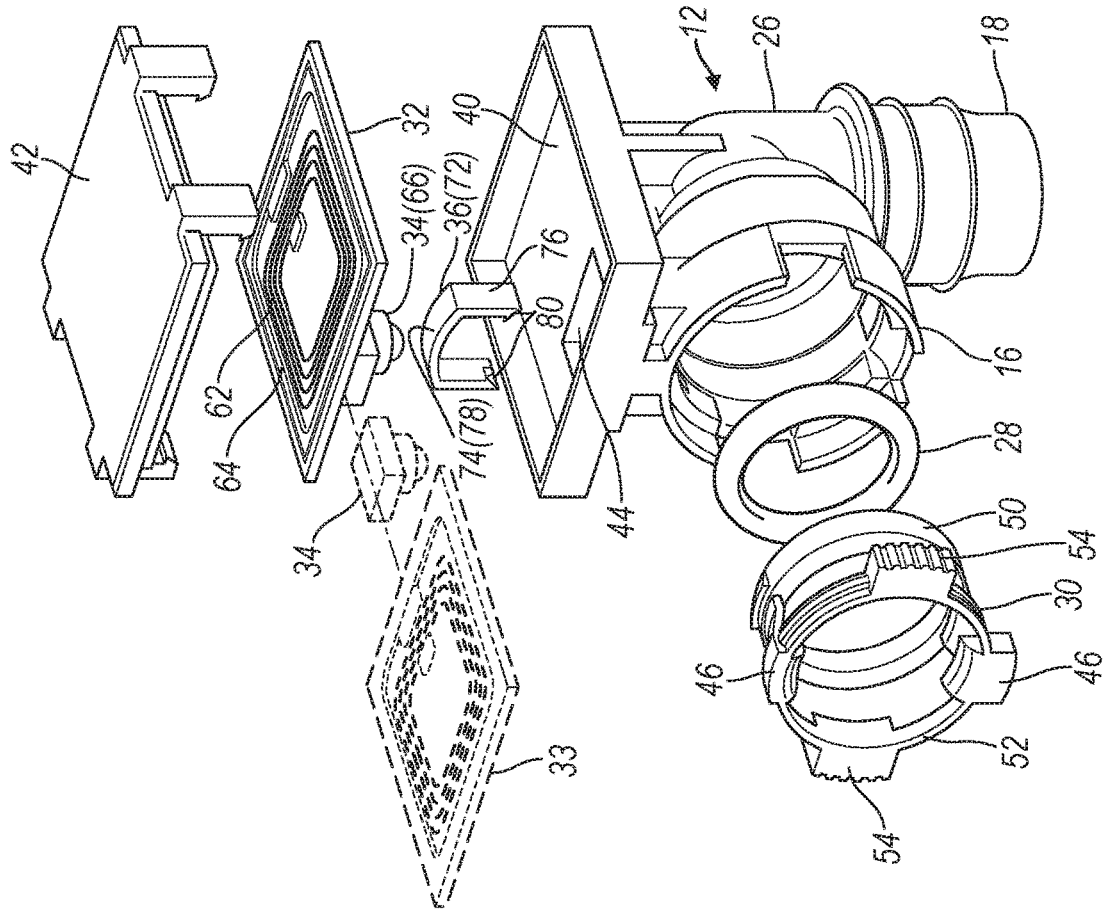
FIG. 4 is a sectional view of the fluid line connector assembly of FIG. 1.

The fluid line connector and assembly can have various designs, constructions, and components in different embodiments, depending in some cases upon the application in which the fluid line connector and assembly are employed. FIGS. 1-4 present a first embodiment of a fluid line connector and assembly 10. The fluid line connector and assembly 10 here includes a fluid line connector 12 and another separate and discrete connector 14. The fluid line connector 12 has quick-connect functionality for ready connect and disconnect actions with the connector 14 and is used to join automotive fluid lines together. In this embodiment, the fluid line connector 12 is a female connector and the connector 14 is a male connector (often referred to as a spigot). The fluid line connector 12 receives insertion of the connector 14 at a first end 16 in installation, and couples to a fluid line at a second end 18. The fluid line connector 12 has an elbow and L-shaped configuration in the figures, but could have a straight and in-line configuration in other embodiments. The connector 14 could be an integral and somewhat monolithic part of a larger component such as a vehicle battery tray or heat exchanger, or could be an integral and somewhat monolithic part of a fluid line, among many possibilities. With particular reference to FIGS. 2 and 4, the connector 14 has a first flange 20 protruding radially-outboard of its body, and has a second flange 22 spaced axially from the first flange 20 and likewise protruding radially-outboard of the connector's body. The first and second flanges 20, 22 extend circumferentially around the connector 14. The connector 14 has an outer surface 24.

In this embodiment, the fluid line connector 12 includes a body 26, an o-ring 28, an insert 30, a radio-frequency identification (RFID) chip 32, a switch 34, and an actuator member 36; still, in other embodiments, the fluid line connector 12 can have more, less, and/or different components. Referring now to FIGS. 3 and 4, the body 26 has a passage 38 defined in its structure for allowing fluid-flow through the fluid line connector 12. The body 26 also has a compartment 40 for receipt and placement of the RFID chip 32. The compartment 40 is a space that is separate from the passage 38. A removable cover 42 can be provided to close the compartment 40 and enclose the RFID chip 32 therein. The body 26 further has a pass-through 44 for situating and seating the actuator member 36 within the body 26 in assembly. When the actuator member 36 is taken from the body 26 (for instance, as shown in FIG. 3), the passage 38 and compartment 40 communicate with each other by way of the pass-through 44 which is open to both of the passage 38 and compartment 40. The o-ring 28 is received within the passage 38, as perhaps depicted best by FIG. 4, and forms a seal thereat between the fluid line connector 12 and the connector 14. The insert 30 is also received within the passage 38 and is used to help retain the connector 14 when the connector 14 and fluid line connector 12 are secured together. In the example of the figures, the insert 30 has a pair of tangs 46 with hook ends 48 that capture the first flange 20 upon insertion of the connector 14 into the fluid line connector 12 to an appropriate overlapping depth, as demonstrated in FIG. 4. The insert 30 includes a first ring structure 50 and a second ring structure 52 that are bridged together by the tangs 46. Press-downs 54 on opposite sides of the second ring structure 52 can be squeezed to undo the captured first flange 20 for disassembling the connector 14 from the fluid line connector 12.

The RFID chip 32 assists in the detection of proper and full securement between the fluid line connector 12 and the connector 14. The RFID chip 32 transmits and receives radio frequency (RF) signals with an RFID interrogator 56. The RFID interrogator 56 sends an interrogating signal 58 to the RFID chip 32, which responds with an RF signal 60. In this way, proper and full securement detection is carried out with the use of RFID technologies. In a manufacturing facility, for instance, the RFID interrogator 56 can be stationed amid an assembly, inspection, and/or installation production line, and can establish an interrogation zone in which the RFID interrogator 56 seeks to intercommunicate with the RFID chip 32 as the fluid line connector and assembly 10 and larger application are transported through the securement zone. Depending on the manufacturing facility, the RFID interrogator 56 may establish an interrogation zone that spans several meters from the RFID interrogator 56. In another setting, the RFID interrogator 56 can be a mobile device such as a hand-held device. The RF signal 60 can convey various data and information to the RFID interrogator 56. In an embodiment, the information conveyed can be an indication of the state of securement between the fluid line connector 12 and the connector 14. For example, when the fluid line connector 12 and connector 14 exhibit full securement, the RF signal 60 can convey the fully secured information in the form of an ON signal to the RFID interrogator 56. The RFID interrogator 56 can in turn process the conveyed information. The information conveyed can also include a serial number, location of installation, etc.

With particular reference to FIGS. 3 and 4, the RFID chip 32 is carried by the body 26. Support between the RFID chip 32 and the body 26 can be effected in various ways. In this embodiment, the RFID chip 32 resides within the compartment 40 and is protected by the cover 42 in installation. At this location, the RFID chip 32 is shielded from exposure to fluid-flow traveling through the passage 38, and is shielded from external sources of contamination, depending on the particular application. The RFID chip 32 has an antenna 62 that exchanges (i.e., transmits and receives) RF signals, and has an integrated circuit (IC) 64 that stores data and information, among other possible functions.

The switch 34 interacts with the RFID chip 32 in order to activate and enable the RFID chip 32 to transmit and receive RF signals with the RFID interrogator 56, and in order to deactivate and disable the RFID chip 32 from transmitting and receiving RF signals. Still, the interaction can influence the functioning of the RFID chip 32 in other ways. In the embodiment presented by the figures, the switch 34 is electrically coupled with the RFID chip 32 to enable and disable the antenna 62 to and from transmitting and receiving RF signals. The switch 34 can have various designs, constructions, and components in different embodiments, depending in some cases upon the RFID chip that it interacts with and the design and construction of the accompanying connectors. For instance, the switch 34 can take mechanical, electrical, and magnetic forms. In one embodiment, and referring to FIGS. 3 and 4, the switch 34 is in the form of a button 66 mounted to the RFID chip 32. As demonstrated best by FIG. 4, the button 66 is located between the RFID chip 32 and the actuator member 36, and adjacent the pass-through 44. When impinged and physically pressed, the button 66—due to its electrical coupling to the RFID chip 32—activates and enables the antenna 62 to transmit and receive RF signals. A single press and release of the button 66 can activate the RFID chip 32, or a maintained impingement and pressing can activate the RFID chip 32 for the duration over which the impingement and pressing persists, depending on the embodiment. Conversely, a single press and release of the button 66 can deactivate the RFID chip 32, or an absence of a maintained impingement and pressing can deactivate the RFID chip 32 for the duration over which the impingement and pressing is lacking.

Furthermore, in other embodiments, the switch 34 can be prompted to activate and deactivate the RFID chip 32 by other means. With particular reference to FIG. 4, another embodiment carries out the prompting by use of a non-contact switch in lieu of a contact-based switch. A reed switch 68 is carried by the body 26 of the fluid line connector 12, and a magnetic component 70 is carried by the connector 14. Here, when the fluid line connector 12 and connector 14 are in full securement, the proximity between the reed switch 68 and magnetic component 70 prompts activation of the RFID chip 32. Conversely, less than full securement and the attendant remoteness of the reed switch 68 and the magnetic component 70 relative to each other deactivates the RFID chip 32. In this embodiment, the actuator member 36 need not be provided.

The actuator member 36 receives abutment amid full securement actions and at full securement between the fluid line connector 12 and the connector 14, and thereby prompts impingement of the switch 34. The actuator member 36 can have various designs, constructions, and components in different embodiments, depending in some cases upon the design and construction of the switch 34 and the accompanying connectors. In the embodiment of the figures, and referring now to FIGS. 3 and 4, the actuator member 36 spans between the passage 38 and the switch 34 to provide an interrelationship between the connector 14 and the RFID chip 32. The actuator member 36 is carried within the body 26 of the fluid line connector 12 and is situated and seated in the pass-through 44. At its location, the actuator member 36 has one end at the passage 38 and another end at the switch 34. In the embodiment of FIGS. 3 and 4, the actuator member 36 is in the form of a cam member 72. The cam member 72 is one-piece and has a U-shaped profile with a base portion 74 and a pair of prong portions 76 depending from the base portion 74. The base portion 74 has a first working surface 78 residing at the switch 34 and maintaining contact with the switch 34. And the prong portions 76 each have a second working surface 80 that reside in the passage 38 for abutment with the connector 14 upon its insertion into the fluid line connector 12. The second working surfaces 80 can be slanted relative to an axis of the connector 14 in order to ease abutment with the connector 14 and to induce the concomitant displacement of the cam member 72.

When the fluid line connector and assembly 10 is employed in use, proper and full securement can be detected via RFID technologies. The fluid line connector 12 and the connector 14 are brought together as the connector 14 is inserted into the body 26 at the first end 16. The first flange 20 comes into abutment with the cam member 72 and displaces the cam member 72 upward (relative to the orientation of the figures) and toward the button 66. The first flange 20 makes surface-to-surface abutment with the second working surfaces 80 of the cam member 72. The cam member 72 is urged upward and impinges the button 66 via surface-to-surface contact between the first working surface 78 and a confronting surface of the button 66. In this embodiment, the first flange 20 maintains abutment with the cam member 72 and the cam member 72 hence maintains impingement with the button 66 at full securement.

In another embodiment, the fluid line connector 12 includes more than a single RFID chip. With particular reference to FIG. 3, a second RFID chip 33 is provided in addition to the first RFID chip 32. And like the first RFID chip 32, the second RFID chip 33 assists in the detection of proper and full securement between the fluid line connector 12 and the connector 14. In this embodiment, both of the first and second RFID chips 32, 33 transmit and receive RF signals with the RFID interrogator 56. In an example, when the fluid line connector 12 and connector 14 exhibit full securement, the first RFID chip 32 can convey the fully secured information to the RFID interrogator 56. Conversely, when the fluid line connector 12 and connector 14 are not fully secured together, the second RFID chip 33 can convey this less-than fully secured information to the RFID interrogator 56. Further, at full securement, the second RFID chip 33 does not convey the less-than fully secured information to the RFID interrogator 56; and, when not fully secured together, the first RFID chip 32 does not convey the fully secured information to the RFID interrogator 56. As in the previous embodiment, the first and second RFID chips, 32, 33 can convey additional information such as a serial number, location of installation, etc. Whether the first RFID chip 32 conveys its fully secured information or the second RFID chip 33 conveys its less-than fully secured information is managed in part by the switch 34. In this embodiment, the switch 34 interacts with both of the first and second RFID chips 32, 33 and is electrically coupled to both of the first and second RFID chips 32, 33. The interaction and conveyance of information can be effected in different ways. For example, when impinged, the switch 34 can activate and enable the first RFID chip 32 to convey the fully secured information and, when not impinged, the switch 34 can activate and enable the second RFID chip 33 to convey the less-than fully secured information. The impingement and absence of impingement of the switch 34 can deactivate and disable the first RFID chip 32 or the second RFID chip 33.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A fluid line connector, comprising:
   a body having a passage for fluid-flow therethrough;
   a radio-frequency identification (RFID) chip carried by said body, said RFID chip having an antenna for transmitting and receiving radio frequency (RF) signals;
   a switch interacting with said RFID chip in order to enable said antenna to transmit and receive RF signals and in order to disable said antenna from transmitting and receiving RF signals; and
   an actuator member situated adjacent said passage of said body;
   wherein, upon full securement of the fluid line connector with another connector, said actuator member impinges said switch and said switch enables said antenna to transmit and receive RF signals.

2. The fluid line connector of claim 1, wherein, when the fluid line connector lacks full securement with the other connector, said switch disables said antenna from transmitting and receiving RF signals.

3. The fluid line connector of claim 1, further comprising an o-ring received within said passage of said body, and an insert received at least partially within said passage of said body to assist retention of the other connector in securement with the fluid line connector.

4. The fluid line connector of claim 1, wherein said RFID chip has an integrated circuit (IC) that stores data, said antenna enabled to transmit the data upon full securement of the fluid line connector with the other connector.

5. The fluid line connector of claim 1, wherein said body has a compartment separate from said passage, said RFID chip residing within said compartment, said compartment closable by a cover.

6. The fluid line connector of claim 1, wherein said switch is a button and, upon full securement of the fluid line connector with the other connector, said button is impinged and said antenna is enabled to transmit and receive RF signals.

7. The fluid line connector of claim 1, wherein said switch is a button.

8. The fluid line connector of claim 7, wherein said actuator member is a cam member with a first working surface residing at said passage and with a second working surface residing adjacent said button, and wherein, upon full securement of the fluid line connector with the other connector, said second working surface impinges said button and said button enables said antenna to transmit and receive RF signals.

9. The fluid line connector of claim 1, further comprising a second RFID chip carried by said body, said second RFID chip having a second antenna for transmitting and receiving RF signals, said switch interacting with said second RFID chip, wherein, upon full securement of the fluid line connector with the other connector, said switch enables said first antenna or said second antenna to transmit and receive RF signals.

10. The fluid line connector of claim 9, wherein, when the fluid line connector lacks full securement with the other connector, said switch enables the other of said first antenna or said second antenna to transmit and receive RF signals.

11. A fluid line connector assembly comprising the fluid line connector of claim 1, and comprising an RFID interrogator that exchanges RF signals with said RFID chip of the fluid line connector.

12. A fluid line connector, comprising:

a body having a passage;

a radio-frequency identification (RFID) chip carried by said body;

a switch electrically coupled with said RFID chip; and an actuator member spanning between said passage and said switch;

wherein, when the fluid line connector is brought fully together with another connector, said RFID chip is enabled via said switch to transmit and receive radio frequency (RF) signals, said actuator member is displaced to impinge said switch and said RFID chip is enabled to transmit and receive RF signals via the impingement.

13. The fluid line connector of claim 12, wherein said actuator member is a cam member situated at least partially within a pass-through defined in said body, said cam member having a first working surface residing at said passage and having a second working surface residing adjacent said switch, wherein, when the fluid line connector is brought fully together with the other connector, said first working surface of said cam member is abutted and said second working surface is displaced to impinge said switch and said RFID chip is enabled to transmit and receive RF signals via the impingement.

14. The fluid line connector of claim 12, wherein said switch is a button.

15. The fluid line connector of claim 12, wherein said actuator member is a cam member having a base portion and having a pair of prong portions depending from said base portion.

16. A fluid line connector, comprising:

a body having a passage;

a radio-frequency identification (RFID) chip carried by said body;

a switch electrically coupled with said RFID chip; and an actuator member spanning between said passage and said switch;

wherein, when the fluid line connector is brought fully together with another connector, said actuator member is displaced and impinges said switch.

17. The fluid line connector of claim 16, wherein the impingement of said switch enables said RFID chip to transmit and receive radio frequency (RF) signals.

18. The fluid line connector of claim 16, wherein displacement of said actuator member and impingement from said actuator member to said switch occurs via movement of said actuator member in a direction that is transverse to an axial direction of movement of the other connector with respect to said passage of said body.

19. The fluid line connector of claim 16, wherein said actuator member is a cam member.

20. The fluid line connector of claim 19, wherein said cam member has a base portion and has a pair of prong portions depending from said base portion.

* * * * *